March 8, 1966     J. D. RIESER     3,238,805
UNI-MOUNT GEARMOTORED PULLEY AND ITS READYING FACILITIES
Filed Feb. 18, 1963     4 Sheets-Sheet 1
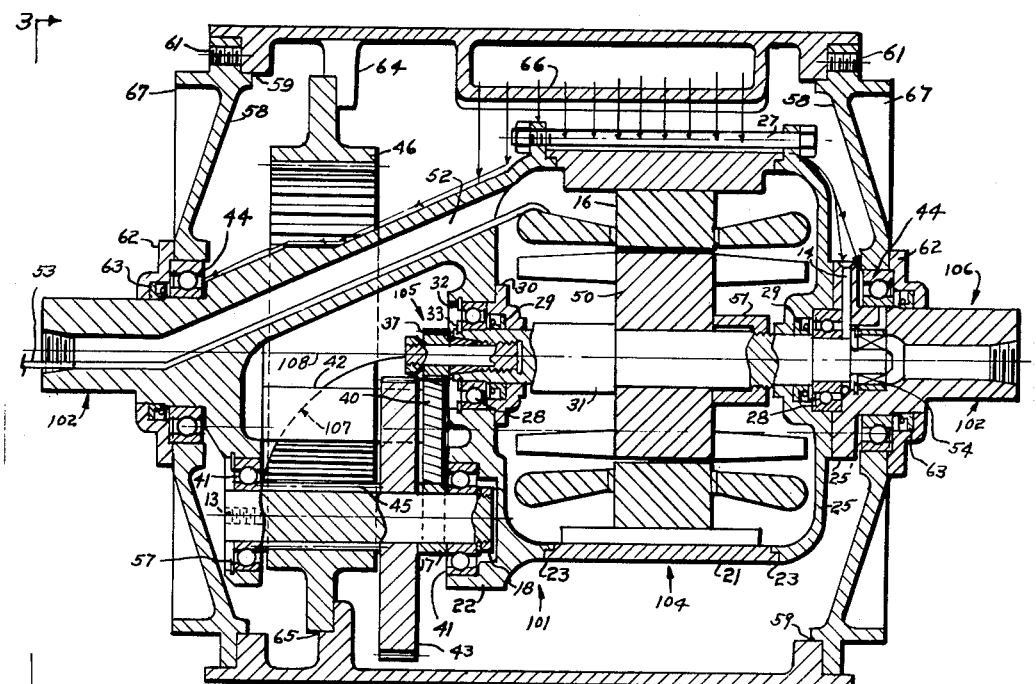
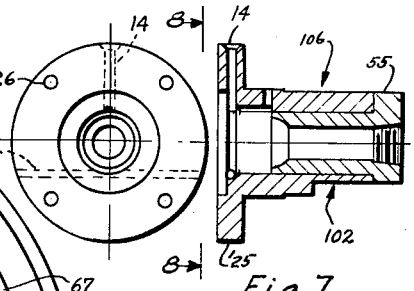
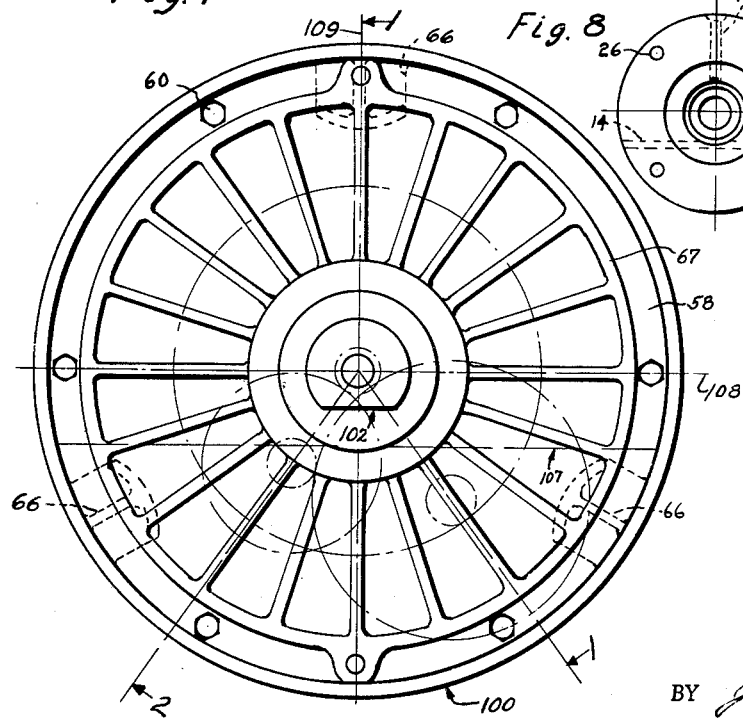
INVENTOR.
BY John D. Rieser March 8, 1966  J. D. RIESER  3,238,805
UNI-MOUNT GEARMOTORED PULLEY AND ITS READYING FACILITIES
Filed Feb. 18, 1963  4 Sheets-Sheet 2

INVENTOR.
BY John D. Rieser

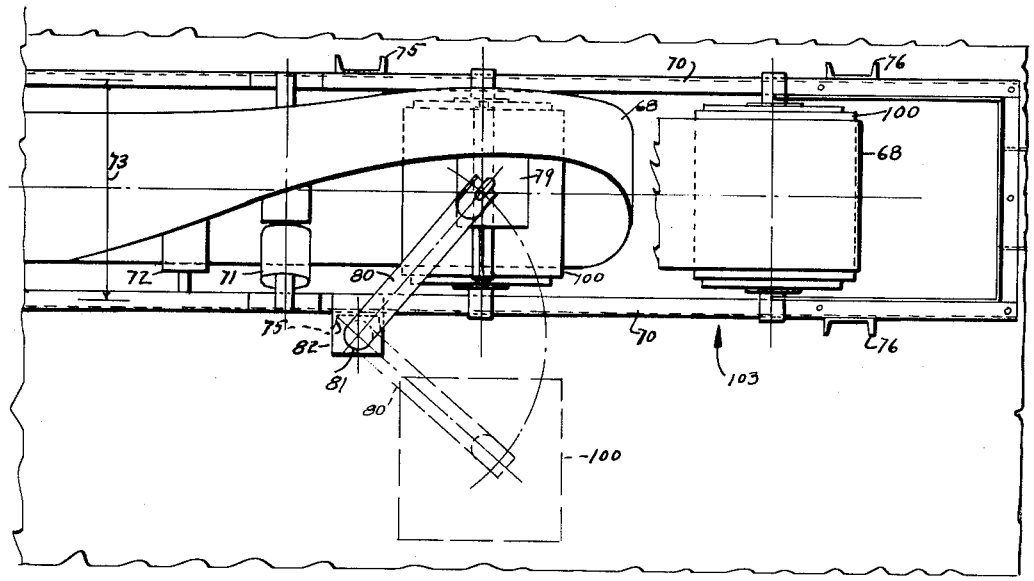
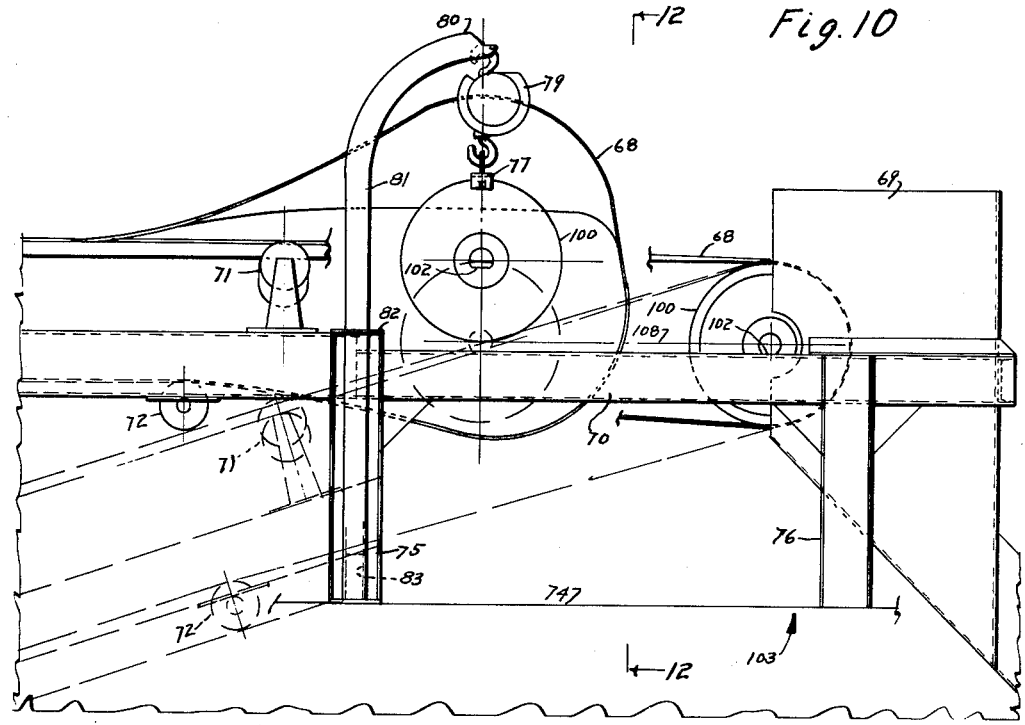
Fig. 10
Fig. 9
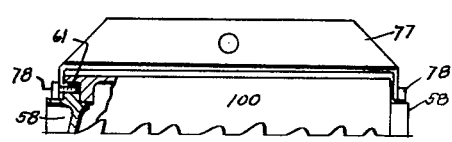
Fig. 11
INVENTOR.
BY John D. Rieser

United States Patent Office 3,238,805
Patented Mar. 8, 1966

3,238,805
UNI-MOUNT GEARMOTORED PULLEY AND
ITS READYING FACILITIES
John D. Rieser, 693 Mission St., San Francisco 5, Calif.
Filed Feb. 18, 1963, Ser. No. 259,321
9 Claims. (Cl. 74—421)

This invention relates to a unimount gearmotored pulley wherein the pulley itself forms the hollow power takeoff of a motorized speed change mechanism disposed therein, and includes novel modifications, improvements, and operation facilities particularly adapted for directly driving an endless conveyor belt of various conveying systems, on that disclosed in my Patent No. 2,905,010, dated September 22, 1959, and entitled "Electrically Operated Self-contained Speed Change Mechanism."

One of the difficulties in providing ready made self-contained drives of the present character for belted conveyor systems is that in practice the required belt speeds vary over a wide range, which necessitates that the reduction gearing between the high speed driver motor and the lower speed of the driven pulley be such so as to cope with the lowest belt speeds, resulting in a multiplicity of intermediate reduction gears between the first gear at the motor shaft and the final gear driving the pulley structure, with the undesirable end result that the number of gears and bearing elements remains the same in a given driver whether the belt speeds happen to be in the low or high speed ranges.

An object of the present invention is to provide an improved and simplified unimount gearmotored pulley in which the pulley itself forms the power takeoff of a motorized speed change mechanism disposed therein, and wherein a given unit having internal facilities for a multiplicity of intermediate gearings arranged to cope with drive applications where the driven belt speed happuens to be in the low speed range, and the arrangement of such arranged facilities being disposed so as to readily permit eliminating a material portion of the intermeidate gearings and bearing elements when applied to drive belts in the upper speed ranges.

Another object of the present invention is to provide an improved and simplified unimount gearmotored pulley in which the pulley itself forms the power takeoff of a motorized speed change mechanism disposed therein and in which an internal end of the motor shaft having a wedge type facility arranged to readily permit of placement and removal of the first gear of the first speed change mechanism.

An additional difficulty in providing ready made self-contained drivers of the present character for belted conveyor-systems, is whether a given premanufactured unit is to drive a horizontal or an elevating type of conveyor, or whether the direction of rotation be clockwise or counter-clockwise. While a horizontal conveyor requires no backstop, in an elevating type conveyor it becomes desirable to provide a mechanical self-acting backstop that prevents a backward rotation of the driver pulley in case of an electrical power failure, and of which elevating type conveyor the direction of rotation of the pulley must be known prior to the backstop being included into a particular driver unit. Backstops have been included in motorized pulley structures heretofore. However, to mount same involves the undesirable feature of dismantling portions of the driver motor or their geared speed change unit.

Another object of the present invention is to provide an improved and simplified unimount gearmotored pulley in which the pulley itself forms the power takeoff of a motorized speed change mechanism disposed therein with a facility for selectively including a mechanical backstop in adjacency to an end journal for the pulley.

In the provision of ready made self-contained drivers of the present character for belted conveyor systems, the inclusion of a high speed driver motor and a speed change mechanism together with their necessary supporting structures within and including the pulley itself, unitized as a single unit, unavoidably produces further difficulties. Whether the particular units happen to be of the type having a live end supported in a separate bearing or of the type having a pair of non-rotating ends with individual closure structure for its speed change mechanism within the pulley, and other types, the units involve more weight than can be manhandled to place the same between a fixedly spaced pair of ordinary belt conveyor stringers or the like, which stringers, in so far as concerns belted conveyor systems, provide the sole foundation for its operation. Heretofore the difficulty of weight materially limits the use of these unitized units in the field of belted conveyor systems owing to these systems being located in restricted out of the way places away from ordinary hoist equipment. And nowhere do these unitized units contemplate the inclusion of a simple inexpensive integrally combined mechanical conveyor handling system to overcome this inherent difficulty of excessive weights readily. In practice, particularly in the belted conveyor field in which the present gearmotored pulley advantageously applies as the driver unit, overcoming the aforesaid matter of excessive weight is material to provide for operative continuity and to overcome the aforesaid limits concerning the use of these driver units. Not only must the driver unit as a whole be conveyed into place intermediate the spaced pair of stringers at the time of initial installation, but eventually the driver unit must also be withdrawn therefrom as a whole to permit readily of operative inspections and repairs concerning their mechanisms that are enclosed within the pulley itself, after which, the unitized driver unit obviously must be re-installed intermediate the aforesaid stringers. These essential operative inspections and repairs become prohibitive when the driver unit is in place with a stringer at each of its ends, which conclusively shows that a combined mechanical conveyor handling system to overcome the matter of excessive weights readily, as mentioned above, becomes in an actual sense an essential element of the unit as well as being essentially an interrelated part of its operativeness.

Another object of the present invention is to provide an improved simplified unimount gearmotored pulley in which the pulley itself forms the power takeoff of a motorized speed change mechanism disposed therein and adapted for driving an endless conveyor belt of various types of conveyor systems which include a pair of spaced conveyor stringers suitably arranged and which include manually actuated mechanical facilities for conveying the pulley between the pair of conveyor stringers for its installation and removal for inspections and repairs.

Other more specific objects and advantages will appear from the following description of the illustrations showing embodiments of the present invention.

In the drawings accompanying and forming a part hereof:

FIGURE 1 is a side view in free position of my gearmotored pulley with triple reduction speed change mechanism, partly in section, taken on the line 1—1 of FIGURE 3.

FIGURE 3 is an end view, viewing in the direction of arrows 3—3 of FIGURE 1.

FIGURE 7 shows a modification of a portion of the right-hand end of the motor end bell apart from the unit, but modified to show a method for applying a backstop element while retaining the assembly relationship of the unitized unit.

FIGURE 8 is an end view in direction of the arrows 8—8 of FIGURE 7 to show the keyway for the backstop element.

FIGURE 9 is a side view of the fixed supports at the drive end of a horizontal and inclined belted conveyor according to my invention showing a combination arrangement of the pulley together with the pulley's manually actuated pivotal conveyor for operable placement and removal for ready inspection and repair of the conveyor drive apart from between the fixed supports and the endless conveyor belt.

FIGURE 10 is a plan view of FIGURE 9 which also shows the pivotal mechanical conveyor by means of dash lines turned 90 degrees.

FIGURE 11 is an enlarged fragmentary side view of the pulley, partly broken away to show attachment thereto of a portion of the mechanical conveyor.

Figure 12:
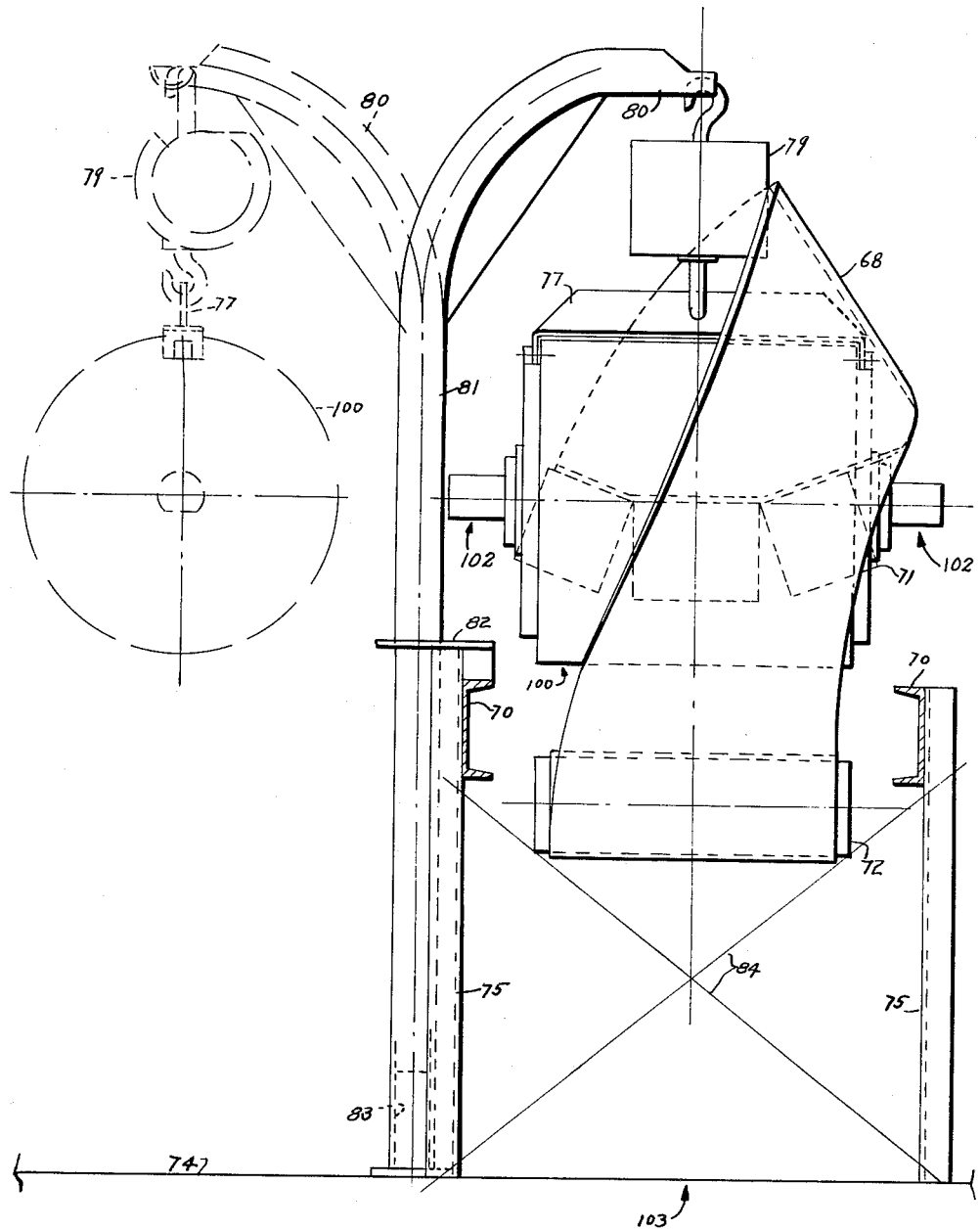

FIGURE 12 is an enlarged end view partly in section taken on the line 12—12 of FIGURE 9, also showing by means of dash lines the pivotal mechanical conveyor turned 90 degrees similar to that shown at the FIGURE 10.

Referring to FIGURES 1 and 9, the unimount gearmotored pulley is hereinafter referred to as the unit or the driver unit. Generally the unit is formed of the fluid tight hollow power takeoff 100, which also is referred to as the driver or pulley, and which is suitable journaled for rotation on the stationary member generally indicated by the numeral 101, which extends through and beyond the hollow power takeoff 100. At each end beyond the ends of the pulley 100, this member 101 includes the pair of spaced mounting bases 102 for operably mounting the unit upon their resting on the top faces of corresponding spaced pair of horizontal disposed supporting stringers at the head end, generally indicated by the numeral 103, of either a horizontal or an inclined belt conveyor or the like. The head end 103 including selective manually actuated mechanical conveyor facilities for placement of the unit intermediate the pair of supporting stringers or removal therefrom for inspection and repair by the pair of supporting stringers having a horizontal length to permit shifting the unit from its normal operating position a distance and direction to cause a free loop at this portion of the endless conveyor belt to permit of removal of the pulley readily from between said stringers and simultaneously from within said free loop. Within the power takeoff 100, the member 101 includes the prime mover, generally indicated by the numeral 104, which is an electric motor having desired electrical characteristics and connections for desired direction of its rotation. The motor 104 having an output shaft with a wedge action connector, generally indicated by the numeral 105, at one end for a first gear of an elective amount of speed change mechanism extending to the power takeoff 100. The other end of said output shaft has an extension beyond the motor to provide an engagement surface for the arresting of a reverse rotation upon the inclusion of a backstop element into the facility generally indicated by the numeral 106, within an end portion of the stationary member 101. Internally, the pulley 100 has a fluid lubricant 107 for lubrication of all the speed change mechanism, journal bearings and the backstop element. Upon operation of the unit, this fluid 107 causes wetting of all the external surfaces of the motor 104 and the internal surfaces of the power takeoff 100, thereby causing heat transfer to the atmosphere from the external surfaces of the pulley ends and their finnings. The dot and dash lines numbered 108 are to be read as the horizontal center line, while the dot and dash line 109 is to be read as the vertical center line. While the dot and dash circles in FIGURE 3 are to be read as the pitch circles of the respective gears within the pulley, which the invention provides that the number of gearings may be modified to provide a desired conveyor belt speed within a given driver unit, without resorting to the performance of construction or machining changes.

Figure 5:
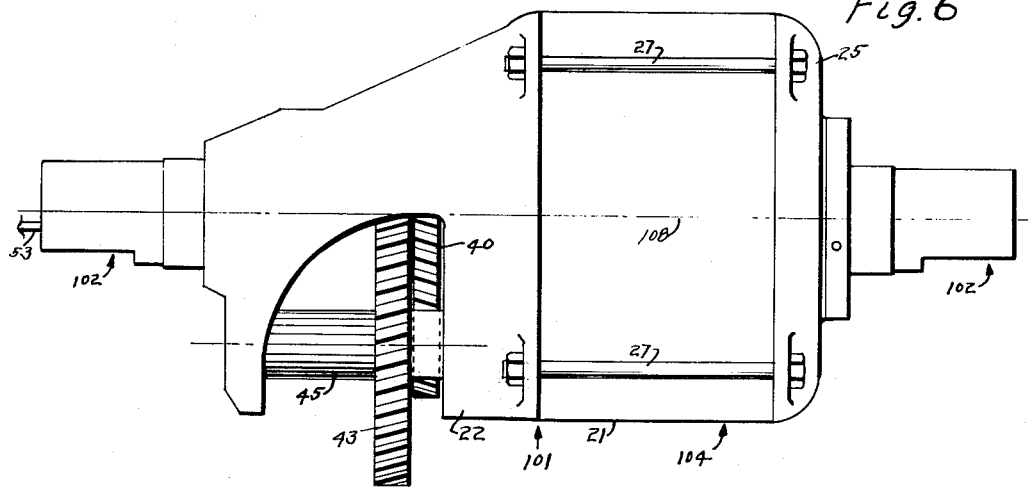
FIGURE 5 is an external side view, similar to that shown in FIGURE 1, of the member provided for mounting journalings for the power takeoff (pulley) in adjacency to each of the mounting bases at end portions of the motor end bell extensions.
Figure 4:
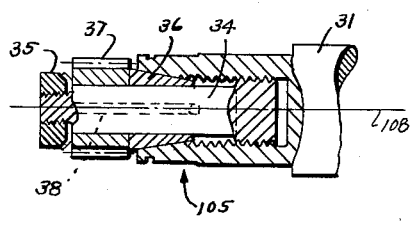
FIGURE 4 is an enlarged view of an end portion of the motor shaft showing in section the novel mounting of the first gear of the power takeoff of the gearmotored pulley.

Of the stationary member 101, FIGURES 1 and 5, the motor 104 is of the footless class of regular construction, in which the frame 21 includes regular stator and coils 16 and the front or output end suitably engages a corresponding end of the extension 22 to form a fluid tight connection as at 23. At an upward portion of the extension is a conduit 52 for the motor lead-in wires 53 and having its outward end screw threaded for a conduit box or the like (not shown). The other end of the frame 21 in a similar manner at 23 engages the extension 25, which in the present instance includes the stub 25' suitably secured thereto in a concentric manner, hereinafter described, as by a series of screws 26 indicated in FIGURE 8. Both these extensions 22 and 25 include a series of lugs for the rod bolts 27 (only one being shown at the FIGURE 1) to form a rigid continual single member 101 having the pair of spaced mounting bases 102, heretofore mentioned. In concentric relation to the centering engagement at 23, both of these extensions 22 and 25 are bored for the bearings 28 and for facilities supporting the seal members 29. The seal 29 at the output end is within a cap 30 which is suitable fastened to an inner surface of the extension 22 by screws that are not shown. These bearings 28 form journal support for the motor output shaft 31 which is held against endwise movement by suitable shoulders and the snap rings 32 and 33. The motor shaft 31 mounts in regular manner the motor rotor 50 which is clamped between a shoulder and the nut 51. And at the output end the motor shaft 31 includes the wedge action connector 105 for mounting the first gear 37 of the aforesaid speed change mechanism. FIGURE 4, shows an enlargement of the wedge action connector 105 apart from the unit, and which is formed of a stub shaft 34 having external screw threads at its head end, threadingly engaging internal screw threads within the shaft 31, with a shank portion of the stub shaft 34 extending outwardly from within the shaft 31 and which at its outward end is provided with screw threads for the nut member 35. This end of the motor shaft 31 has a taper bore for the split taper bushing 36, so that with the first gear 37 on the shank of the stub shaft 34 disposed between the large end of the bushing 36 and the nut member 35, screwing in of the nut member causes a wedging action that results in gripping forces between the respective parts for drive purposes and to maintain concentric relationship no matter how often it becomes necessary to renew the first gear 37. A drive key 38 shown by means of dotted lines may also be included.

Figures 2, 6:
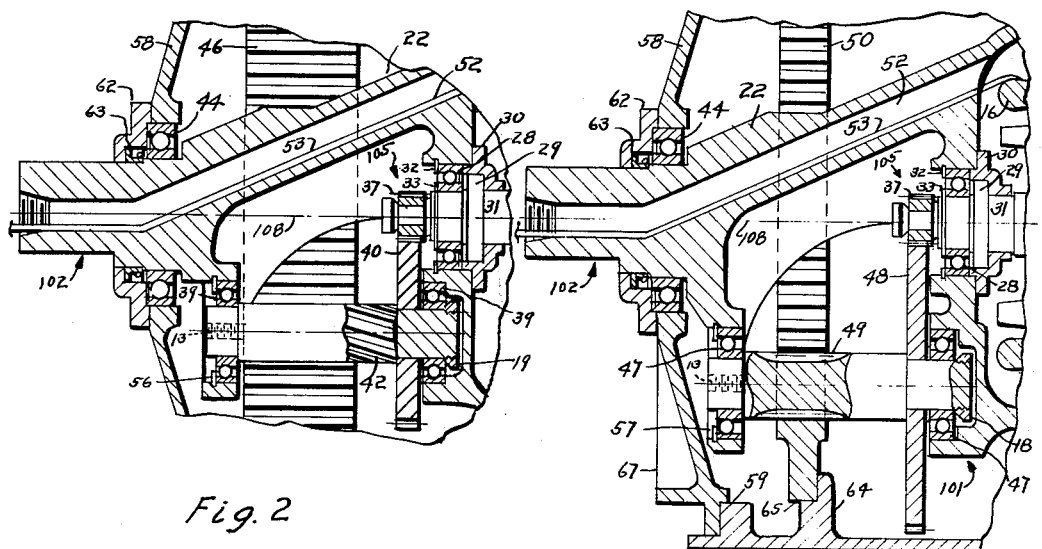
FIGURE 2 is a fragmentary side view similar to that of FIGURE 1, but taken on the line 2—2 of FIGURE 3.
FIGURE 6 is a fragmentary side view similar to that of FIGURE 1, but with only double reduction speed change mechanism, to show that at least one of the multi-pairs of supports for bearings to journal intermediate gearings may be applied in providing units having either double or triple reduction speed change mechanisms.

Now referring to the FIGURES 1, 2, 3 and 6, at the motor output end the extension 22 provides multi-pairs of journaling support facilities for bearings that form journal means for the intermediate gearings and they are arranged so that at least one pair of said multi-pairs of support facilities be applicable for either a speed change mechanism with only double reduction or with triple or more reductions. FIGURES 1, 2 and 3, show a case of a unit with triple reduction speed change mechanism, of which the pair of aligned bearings 39 with snap ring 56, serve the first reduction involving the gears 37 and 40, of which the gear 40 is held in place by the locknut 19, shown in FIGURE 2, and the aligned pair of bearings 41 with snap ring 57, serve the second reduction, involving the gears 42 and 43, of which the gear 43 is held in place by the locknut 18 and the spacer 17, while the aligned pair of bearings 44 serve the third reduction, and involving the gear 45 and the final gear 46 which is attached to an internal portion of the power takeoff 100, as the bearings 44 provide the journal support for the power takeoff as hereinafter described. FIGURE 6 shows a case of the same unit with but a double reduction speed change mechanism, of which the very same pair of bearing support facilities are used for the pair of aligned bearings 47 and snap ring 57 that serves the first reduction, involving the gears 37 and 48 of this double reduction unit, as had been used for the second reduction of the triple reduction unit hereinabove described, and to hold the gear 48 in place again utilizing the locknut 18. Of this double reduction unit, the second or final reduction involves the gear 49 and the final gear 50, which is attached to an internal portion of the power takeoff 100 and journaled for rotation by the bearings 44. I have shown the width of the final gear 50 as being less than that of the final gear 46, as less torque forces are involved at the higher speeds. Thus, it becomes apparent that the present invention provides a means whereby a ready-made (stock or given) unit may readily be assembled to provide the driver means for a belted conveyor system wherein its belt is to travel within a high speed range or within a low speed range, without the need of specifically having to manufacture a driver unit for each case. Consequently when assembled with belt speeds in the higher speed ranges the device provides a means within a given unit to eliminate gearings, bearings and shafting elements, without eliminating possibilities of assemblying stock driver units to cope with belt travel in the lower speed ranges, which in practice is material for the reason that for stock purposes, each size unit is manufactured in considerable quantity, and of which their particular speed range requirements become an unknown matter until the time of their being sold from stock. And it is to be particularly noted that each pair of journaling support facilities heretofore mentioned are disposed to straddle the final gear. The tapped hole 13 at the end of the shafts for the gearings 42, 45 and 49 are for attaching a puller when effecting gear changes, which is readily accomplished as the lower portion of the extension is open (best seen in FIGURE 5).

For purposes of concentricity the stub 25' is bored to fit onto an external portion of the outer race of the bearing 28 at this end of the member 101. Also the stub 25' is bored and provided with a keyway and a snap ring to provide facility for a selective application of a standard backstop element 54, shown in a general manner by means of crosses in FIGURE 1. The facility provides for the outer race of the backstop element being disposed between a snap ring and a shoulder and keyed so, that upon operation of the unit, it remains stationary along with that of the member 101. These standard backstop elements 54 (not shown in detail) within their outer race include a series of sprags that extend to the shaft surface or the like and are sloped and formed to freely permit the shaft to be rotated in a normal direction and upon the shaft starting to rotate in a reverse direction, the sprag ends grip said surface in a manner to arrest a backwards rotation. These backstop elements are reversable, since at time of manufacture of the unit its final direction of rotation or whether a backstop element is desired is an unknown matter. To conveniently solve such unknown matters, the present development provides for ready inclusion of backstop elements into ready made units of the present character. Referring to the modifications FIGURES 7 and 8, as a further expediency I have shown the stub '25 having a bore of size to permit a backstop element being passed therethrough into the aforesaid facility, after which the flanged bushing 55 is included and suitably secured thereto so as to form a fixed part of the stub '25. In both cases the stubs '25 and 25' include a tapped hole for the inclusion of a filler or breather plug (not shown). And within the power takeoff the assembled extension 25 includes lubrication entrance and escape apertures 14 to provide the lubricant fluid providing lubrication of the bearing 28 and the backstop element 54 in the event of its being included to fulfill an inclined conveyor requirement or the like.

The power takeoff 100, FIGURE 1, includes a pair of ends 58 fastened thereto oil tight as at 59 by a series of screws 60, shown in FIGURE 3. Each end 58 has a pair of tapped holes 61 for backoff screws (not shown). Also one tapped hole 61 at each end serves the dual purpose of a selective attachment thereto of the manually actuated mechanical conveyor facility at the head end 103 of a belted conveyor system, heretofore mentioned, and to be further described. Also, at least one of the ends 58 has oil level and filler facilities. Concentric to the external diameter of the power takeoff 100, each of the ends 58 are bored for reception of the bearing 44, which is held in place by the adaptor 62 for the oil seal 63 and suitably fastened onto an outer face by screws not shown. The inner race of each bearing 44 is fitted onto a portion of the stationary member 101 in adjacency to a shoulder and the mounting base 102 disposed at each end portion of the member 101, which for operative rotation of the power takeoff must rest on corresponding surfaces at the head end structure of a belted conveyor.

Internally the power takeoff 100 includes a series of lugs 64 which are bored for attachment thereto rigidly a flange portion of the final gear 46 of the speed change mechanism heretofore described, as at 65, as well as a series of bolting means not shown, so as to cause rotation of the power takeoff 100 upon actuation of the prime mover 104. Also internally the power takeoff 100 includes a spaced series of buckets 66 (only one being shown in FIGURE 1) at the inner circumference of the power takeoff and arranged to lift and spill the fluid 107 onto external surfaces of the motor above the normal level of the fluid within the pulley in a continual manner upon operation of the unit. The arrowed lines in a general manner indicate the spilling of the lubricant fluid from a bucket 66 onto an upper surface of the prime mover 104, thence a portion flowing into the aperture 14 leading to and for lubrication of the bearing and the possible backstop element, also to the bearings 44. Since a portion of the gears extend into the fluid this provides of the gears being lubricated, as well as by splash lubricating of the other bearing 28.

And additionally this fluid 107 serves to transfer the heat generated by the prime mover and the speed change mechanism into the walls of the pulley, and their moving external surface areas cause dissipation of such transfered heat to the surrounding atmosphere. For this purpose there is included the finning 67 on the outward face of each end 58 to provide ample surface area apart from the external area of the pulley's driving circumference for contacting and driving the conveyor belt, thereby avoiding excessive amount of heat and its detrimental effects reaching the expensive rubber covered conveyor belts. Also in some belted conveyor systems, to increase drive friction between the driver pulley and the endless conveyor belt, the driving face of the driver pulley is lagged with rubber, which would change or impair rate of heat transfer therethrough.

The combination of mechanical readying or conveyor facilities with driver pulleys of the present character for endless belted conveyor systems is essential to fulfill conditions of operativeness and to overcome excessive weights inherently involved by the inclusion into a single unitized form, the driver motor, speed change mechanism, self-contained journaling structures together with an aligned pair of mounting bases and the journaled driver pulley itself, which inherently produces more weight than can be coped with manually within a restricted and out of the way psace ordinarily encountered at the head end of belted conveyor systems.

Referring now to the FIGURES 9, 10, 11 and 12, and starting with FIGURE 9, showing a side view of the pressent combination 103 at the head or drive end portion of an ordinary endless belted conveyor, by means of solid lines there is indicated a horizontal conveyor system and by dash lines an inclined conveyor system. And it is to be particularly noted that the readying or conveyor combination with the unit does not vary whether the conveyor system happens to be horizontal or inclined. And beginning with the horizontal conveyor system, the numeral 68 represents this portion of the endless conveyor belt, extending drivingly around the driver pulley 100, while in its normal position, partly within the bulky discharge box or chute 69 and disposed between the fixed spaced pair of stringers 70 with the mounting base 102 resting on a top face at each of the stringers. Ordinarily these bases 102 are anchored onto the stringers by U bolts or the like (not shown). The top or carrying side of the belt is shown extending toward the left, but a portion broken away before it reaches the first troughing or carrying roll 71. The bottom or return side of the belt is also shown extending toward the left and a portion broken away before it reaches the first return roll 72. In practice both the carrying and return rolls are fastened onto respective portions of a spaced pair of conveyor stringers or the like, of which in practice their gauge spacing 73 is a well established matter, being the width of the belt plus nine inches. At the inclined conveyor the dash lines representing the conveyor belt extend on a slope downwardly to the first carrying roll, shown by means of dash lines, as is also the case at the bottom side to the first return roll. The horizontal line 74 represents in a general manner the floor or walkway and the numerals 75 and 76 indicate generally vertical struts carrying the spaced pair of stringers 70. And between these two pairs of struts 75 and 76, the pair of spaced stringers 70 extend horizontally a distance to provide sufficient endless belt slack to permit the formation of a free belt loop, as generally indicated in FIGURES 9, 10 and 12 upon the unit being shifted from its normal position to that indicated by the dash line circle toward the left. This permits the unit to be withdrawn from between the pair of spaced stringers by the manually actuated mechanical readying or conveyor facilities, generally included into that indicated by the numeral 103. The lower attachment is formed by a bale 77 that is removably secured to the pulley ends 58 by means of a pair of capscrews 78 and hand screwed into the tapped hole 61 heretofore described (best seen at the enlarged FIGURE 11). And to the lower attachment is hooked a chain block 79 or the like, of which its upper attachment hooks onto a cantilever arm 80 of the pivotal mounted tubular standard 81. Chain pulls at the block 79 are not shown as various types of standard inexpensive lifting devices may be advantageously used. In FIGURES 9 and 12, the unit is shown in an upward position free from between the pair of spaced stringers 70, but partially within the free loop of the endless conveyor belt 68. In FIGURES 10 and 12 there is indicated by means of dash lines the standard and the unit swung out over the walkway free of the conveyor supporting structures and of the free loop of the endless conveyor belt, for being placed onto or taken away from a hand truck or the like. The standard 81 is disposed at a selective side of the conveyor supporting structure and pivotally mounted by extending through the plate 82, which is a part of the supporting structure and at the floor having a pin 83 suitably arranged for its support and extending into the tubular standard to form the lower pivotal point and support. In FIGURE 12, the single lines 84 crossing one another represent bracing members to provide ample rigidity. In practice a conveyor belt becomes endless, whether the end portions of the original belt are spliced or coupled by fasteners. And to prevent the weight of the endless belt taking up the slack of the free loop, the top and bottom strands are removably attached to the conveyor stringers.

FIGURES 9 and 10, readily show that the spaced conveyor stringers at the head end of a belted conveyor system for supporting the weight of the unit prohibit possibility of performing essential maintenance and repairs involving any of the actuating parts within the driver pulley of the unit. Practicable problems and practicabilities concerning operation of the unit itself are readily solved by the present combination of the gear-motored pulley with suitable supporting structures at the head end of a belted conveyor together with detachable manual actuated mechanical readying facilities hereinabove described.

Various changes may be made in the embodiment of the invention hereinabove specifically described without departing from or sacrificing the advantages of the invention as defined in the appended claims.

I claim:

1. In combination, a driver unit having mounting base means and a hollow power takeoff journaled at its ends on a member intermediary said mounting base means at ends of said member arranged to hold it stationary while extending through said takeoff which is operably coupled for rotation through speed change gears driven by a motor therein secured to and forming a part of said member, in adjacency to said motor and its shaft, said member providing multi-pairs of journaling support means, said speed change gears having a first gear, a final gear and an elective number of intermediate gearing sets operably connecting said first gear and said final gear, of which the first gear is secured to the shaft of said motor, while the final gear is attached onto an internal portion of said takeoff, with an elective number of said intermediate gearing sets supported by corresponding portions of said support means, of which at least one pair of said multi-pairs of support means are disposed to supportably mount a single set of the intermediate gearings operably connecting said first and final gears, and correspondingly for the final set of intermediate gearings when a greater number of intermediate gearing sets are applied to operably connect said first and final gears, thereby, within a given unit, providing a means for causing a saving in number of individual gears, bearings and shafting elements without upsetting arrangement of said multi-pairs of journaling support means.

2. In combination, a driver unit having mounting base means and a hollow power takeoff with closed ends, said closed ends formed for journaling said hollow power takeoff on a member intermediary said mounting base means at ends of said member arranged to hold it stationary while extending through said takeoff which is operably coupled for rotation through speed change gears driven by a motor therein secured to and forming a part of said member, in alignment to the axis of said motor and its shaft, said member including multi-pairs of journaling support means, said speed change gears having a first gear, a final gear and an elective number of intermediate gearing sets operably connecting said first gear and said final gear, of which the first gear is secured to the shaft of said motor while the final gear is attached onto an internal portion of said takeoff intermediate said closed ends with an elective number of said intermediate gearing sets supported by corresponding portion of said support means, of which at least one pair of said multi-pairs of support means are disposed to supportably mount a single set of the intermediate gearings operably connecting said first and final gears, and correspondingly for the final set of intermediate gearings when two and more sets of the intermediate gearings are applied to operably connect said first and final gears while maintaining the relationship between said multi-pairs of journaling support means.

3. In combination, a driver unit having mounting base means and a hollow power takeoff with closed ends, said closed ends formed for journaling said hollow power takeoff on a member intermediary said mounting base means at ends of said member arranged to hold it stationary while extending through said takeoff which is operably coupled for rotation through speed change gears driven by a motor therein secured to and forming a part of said member, in alignment to the axis of said motor and its shaft, said member including journaling support means, said speed change gears having a first gear, a final gear and an elective amount of intermediate gearing sets operably connecting said first gear and said final gear, of which the first gear is secured to said shaft at its inner end, while the final gear is attached onto an internal portion of said takeoff intermediate said closed ends with an elective amount of intermediate gearing sets operably connecting said first and final gears while supported by corresponding portions of said support means, an outer end portion of said shaft extending within a corresponding end part of said member for an elective application of a mechanical backstop element, said part being bored and fitted for holding the outer casing of said element stationary and having an aperture extending from within said takeoff to said end portion and to an exterior end of said member for breathing and lubrication purposes.

4. In combination, a driver unit having mounting base means and a hollow power takeoff with closed ends, said closed ends formed for journaling said hollow power takeoff on a member intermediary said mounting base means at ends of said member arranged to hold it stationary while extending through said takeoff which is operably coupled for rotation through speed change gears driven by a motor therein secured to and forming a part of said member, in alignment to the axis of said motor and its shaft, said member including journaling support means, said speed change gears having a first gear, a final gear and an elective amount of intermediate gearing sets operably connecting said first gear and said final gear, of which the first gear is mounted on a stub shaft between a nut and the large end of a split taper bushing, said stub shaft having external screw threads engaging internal screw threads within an end portion of said motor shaft, and in adjacency to said internal threads said end portion having a taper bore for said taper bushing extending therein, so that screwing in of said nut causes said first gear to be pressed onto said large end and simultaneously causes gripping of said stud shaft by said taper bushing wedging in said taper bore, the final gear being attached onto an internal portion of said takeoff intermediate said closed ends, while said elective amount of intermediate gearing sets are operably supported by said support means.

5. The invention according to claim 2, wherein said takeoff is substantially fluid tight and incloses a fluid lubricant therein, said multi-pairs of journaling support means having at least portions of two pairs extending into said fluid, so that correspondingly disposed portions of said intermediate gearing sets automatically cause splash lubrication of metal to metal actuating parts within the takeoff upon causing said rotation.

6. The invention according to claim 3, wherein said takeoff is substantially fluid tight and incloses a fluid lubricant therein for lubricant wetting of the backstop element as well as other metal to metal actuating parts by a series of open sided lifters, said lifters being attached onto the inner circumference of said takeoff and formed to automatically lift a portion of said fluid and spill it onto surfaces above the normal level of said fluid upon causing said rotation.

7. In combination, supporting means together with a conveyor means for readying a unit having therein an electric motor to drive a hollow cylindrical power takeoff adapted to form the drive means for an endless conveyor belt of a conveyor system by the unit having mounting base means in adjacency its ends supported on horizontal portions of a fixedly spaced pair of stringers of said supporting means at a normal operative position with said takeoff disposed therebetween, said conveyor means having at a downward part means for attachment to said unit, said horizontal portions for said base means extending beyond said position with an upright standard having at its upper portion a cantilever arm for attachment thereto an upward part of said conveyor means while pivotally mounted in adjacency to at least one of said stringers by said supporting means, said portions extending in direction and distance so that a selective manual shifting of said unit from said position causes said endless belt to slack an amount to form a non-driving loop for removal and placement of said takeoff from and between said pair of stringers and from within and into said loop by an elective actuation of said conveyor means after manually causing said attachment at said upward and downward part.

8. In combination, supporting means together with a conveyor means for readying a unit having therein an electric motor to drive a hollow cylindrical power takeoff adapted to form the drive means for an endless conveyor belt of a conveyor system by the unit having mounting base means in adjacency its ends supported on horizontal portion of a fixedly spaced pair of stringers of said supporting means at a normal operative position with said takeoff disposed therebetween and fixed side walls of a conveyor discharge chute, said conveyor means having at a downward part means for attachment to said unit, said horizontal portions for said base means extending beyond said position with an upright standard having at its upper portion a cantilever arm for attachment thereto an upward part of said conveyor means while pivotally mounted in adjacency to at least one of said stringers by said supporting means, said portions extending in direction and distance so that a selective manual shifting of said unit from said position and said fixed side walls causes said endless belt to slack an amount to form a non-driving loop for removal and placement of said takeoff from and between said pair of stringers and from and into said loop by an elective actuation of said conveyor means after manually causing said attachment at said upward and downward part.

9. In combination, a driver unit having mounting base means and a hollow power takeoff supported for rotation on a member which extends through and beyond said takeoff with said mounting base means at its outward ends, said takeoff operably coupled for rotation through speed change gears driven by a motor therein secured to and forming a part of said member in adjacency to said motor and its shaft, said member providing journaling support means, said speed change gears having a first gear, a final gear and an elective amount of intermediate gearing sets operably connecting said first gear and said final gear, of which the first gear is secured to said motor shaft and the final gear coupled to said takeoff operably with said intermediate gearing sets operably supported by said support means, and said unit having means for elective attachment thereto of a conveyor means, said conveyor means being adapted to cause mechanical conveying of said unit selectively onto and reversely from a pair of parallel disposed foundation members, said foundation members having surfaces to engage said base means, and at least one of said pair of foundation members forming means for support of said conveyor means.

References Cited by the Examiner
UNITED STATES PATENTS

| | | | |
|---|---|---|---|
| 1,313,537 | 8/1919 | Jones | 74—421.5 X |
| 2,439,520 | 4/1948 | Miller | 74—421.5 |
| 2,540,099 | 2/1951 | Christian | 74—421.5 |
| 2,905,010 | 9/1959 | Rieser | 74—421.5 |
| 2,966,068 | 12/1960 | Christian | 74—421.5 |
| 3,005,357 | 10/1961 | Christian | 74—421.5 |

DON A. WAITE, *Primary Examiner.*